US011372889B2

(12) United States Patent
Blank

(10) Patent No.: US 11,372,889 B2
(45) Date of Patent: Jun. 28, 2022

(54) MULTI-MODAL-BASED GENERATION OF DATA SYNCHRONIZATION INSTRUCTIONS

(71) Applicant: THE BANK OF NEW YORK MELLON, New York, NY (US)

(72) Inventor: Brian Blank, Manalapan, NJ (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 17/482,085

(22) Filed: Sep. 22, 2021

(65) Prior Publication Data

US 2022/0129482 A1 Apr. 28, 2022

Related U.S. Application Data

(63) Continuation-in-part of application No. 16/520,896, filed on Jul. 24, 2019, now abandoned, which is a continuation of application No. 15/136,593, filed on Apr. 22, 2016, now abandoned.

(60) Provisional application No. 62/151,232, filed on Apr. 22, 2015.

(51) Int. Cl.
*G06F 16/27* (2019.01)
*G06F 16/23* (2019.01)

(52) U.S. Cl.
CPC ........ *G06F 16/273* (2019.01); *G06F 16/2365* (2019.01)

(58) Field of Classification Search
CPC .......................... G06F 16/2365; G06F 16/273
USPC ....................................................... 707/615
See application file for complete search history.

(56) References Cited

U.S. PATENT DOCUMENTS

| 6,018,721 | A | 1/2000 | Aziz et al. |
| 7,577,601 | B1 | 8/2009 | Rademacher et al. |
| 8,812,438 | B2 * | 8/2014 | Long ............... G06F 16/273 |
| | | | 707/613 |
| 2003/0033240 | A1 | 2/2003 | Balson et al. |

(Continued)

OTHER PUBLICATIONS

Singh, M., et al., "The (sizable) Role of Rehypothecation in the Shadow Banking System," IMF Working Paper, Monetary and Capital Markets Department, Jul. 2010, 16 pages.

*Primary Examiner* — James Trujillo
*Assistant Examiner* — Fariborz Khoshnoodi
(74) *Attorney, Agent, or Firm* — Pillsbury Winthrop Shaw Pittman, LLP

(57) ABSTRACT

In certain embodiments, multi-modal-based generation of settlement instructions may be facilitated. In some embodiments, a portfolio of a live environment may be emulated in a projected environment. A target portfolio may be generated in the projected environment based on the emulated portfolio. Partial synchronization between the target portfolio of the projected environment and the portfolio of the live environment may be performed such that a first subset of changes to the portfolio of the live environment are reflected in the target portfolio of the projected environment. Subsequent to the partial synchronization, the target portfolio of the projected environment may be updated such that the update of the target portfolio accounts for the first subset of changes. Subsequent to the update of the target portfolio, settlement instructions may be generated based on differences between the target portfolio of the projected environment and the portfolio of the live environment.

18 Claims, 24 Drawing Sheets

(56) References Cited

U.S. PATENT DOCUMENTS

| | | | |
|---|---|---|---|
| 2005/0047544 A1* | 3/2005 | Fu | G06T 7/254 |
| | | | 345/629 |
| 2005/0171892 A1 | 8/2005 | Naas et al. | |
| 2007/0233594 A1 | 10/2007 | Nafeh | |
| 2007/0276744 A1 | 11/2007 | Burke | |
| 2008/0215480 A1 | 9/2008 | Mordecai | |
| 2008/0306881 A1 | 12/2008 | Feldman | |
| 2009/0192946 A1 | 7/2009 | Buckmaster | |
| 2009/0276370 A1 | 11/2009 | Olson et al. | |
| 2009/0299895 A1 | 12/2009 | Fitzpatrick | |
| 2010/0030705 A1 | 2/2010 | Tharmananthar et al. | |
| 2010/0169205 A1 | 7/2010 | Labuszewski et al. | |
| 2010/0028665 A1 | 9/2010 | Mathieson | |
| 2010/0228665 A1 | 9/2010 | Mathieson et al. | |
| 2010/0250466 A1 | 9/2010 | Joseph | |
| 2011/0191233 A1 | 8/2011 | Russo et al. | |
| 2011/0231307 A1 | 9/2011 | Caffrey | |
| 2012/0086596 A1* | 4/2012 | Insanic | G01S 7/003 |
| | | | 342/26 D |
| 2012/0150715 A1 | 6/2012 | Boudreauit et al. | |
| 2012/0259796 A1 | 10/2012 | Blank | |
| 2013/0318006 A1 | 11/2013 | Morik et al. | |
| 2015/0000980 A1* | 1/2015 | Williams | E21B 4/02 |
| | | | 175/45 |
| 2015/0032591 A1 | 1/2015 | Jacob | |
| 2015/0081501 A1 | 3/2015 | Chakar et al. | |
| 2015/0081591 A1 | 3/2015 | Chakar et al. | |
| 2017/0131912 A1* | 5/2017 | Sinha | G06F 11/1469 |
| 2019/0297360 A1* | 9/2019 | Wu | H04N 21/4126 |
| 2019/0347730 A1 | 11/2019 | Blank | |
| 2019/0354627 A1* | 11/2019 | Rostagni | G06F 16/273 |
| 2021/0182245 A1* | 6/2021 | Shemer | G06F 16/184 |
| 2021/0232594 A1* | 7/2021 | Solan | G06F 16/27 |

\* cited by examiner

| Asset Class | Priority to be Assigned |
|---|---|
| Treasuries | Highest |
| Treasury Strips | |
| GNMAs Strips | |
| Agency MBS | |
| Agency CMOs | |
| Corporate FDIC Guaranteed | |
| Money Market Instruments | |
| Corporate Investment Grade | |
| Equities | |
| Convertible Bonds | |
| Municipals | |
| Private Label CMOs | |
| ABS Investment Grade | |
| Corporate Non-Inv Grade | |
| Private Label CMOs Non-Inv Grade | |
| ABS Non-Investment Grade | |
| Whole Loans/Trust Receipts | Lowest |

FIG. 3

| Priority | Objective | Use Case (Scenario) Trades Involved | RVP | DVP | CASH |
|---|---|---|---|---|---|
| 1 | Increase dealer's liquidity by returning Auto Cash from all trades to settle RVP trades | a<br>Remove Auto Cash from maturing Principal Decrease trades and use same Auto Cash credit to fund RVP trade settlement<br>• Auto Cash in maturing trades<br>• Auto Cash in Principal Decrease trades. | 2. Settle maturing/Principal Decrease trade using return of Auto Cash credit from the maturing trade (Trade A)<br>○ Receive Auto Cash credit against payment | – | 1. Remove Auto Cash from maturing/ Principle decrease trade (Trade A) |
| | | b<br>Remove Auto Cash from non-maturing trades and use same Auto Cash credit to fund RSVP trade settlement<br>• Auto Cash is non-maturing trades | 3. Settle maturing/Principal Decrease trade using return of Auto Cash credit from the non-maturing trade (Trade B)<br>○ Receive Auto Cash credit against payment | 1. Settle free deliver instruction (Pos A) to allocate collateral to non maturing trades that have auto cash (Trade A)<br>○ Free position deliver – no DVP trade settlement<br>2. remove autocash from non maturing trade (Trade A) | – |
| | Transfer Auto Cash exposure from one non-maturing trade to another non-maturing trade | c<br>Use Auto Cash credit to support removal of ineligible collateral and then use the same collateral to allocate to another trade which has Auto Cash<br>• Auto Cash in non-maturing trade (Trade A)<br>• Ineligible collateral in another non-maturing trade (Trade B) | 1. Settle free receive instruction to receive ineligible collateral (Pos A) from the non-maturing trade and into the dealer box (Trade B)<br>○ *Free receive instruction – no RVP trade settlement*<br>2. Insert Auto Cash to non-maturing trade to replace removal of ineligible collateral (Trade B) | 3. Settle free deliver instruction (Pos A) to allocate collateral to non maturing trades that have auto cash (Trade A)<br>○ *Free position deliver – no DVP trade settlement*<br>4. remove autocash from non maturing trade (Trade A) | – |

FIG. 4A

| Priority | Objective | Use Case (Scenario) Trades Involved | RVP | DVP | CASH |
|---|---|---|---|---|---|
| 1 | Increase dealer's liquidity by settling DVP trades that are funded by the investor | d<br>Settle DVP funded trades that do not have RVP offset(DVP only)<br>• Funded new trades<br>• Funded Principal Increase trades | — | Settle DVP trades that are allocated (using dealer box positions) and funded by the investor **<br>○ *Deliver positions vs. payment* | — |
| | | e<br>Settle DVP funded trades and then use DVP funded cash to settle RVP trades (DVP/RVP)<br>• Funded new trades<br>• Funded Principal Increase trades<br>• Maturing trade<br>• Principal Decrease trades | Settle receive instruction to repurchase collateral (Pos A) from maturing/Principal Decrease trade (Trade A) which are bound with deliver instructions, using funding from the DVP settled trades as primary source of liquidity<br>○ Receive position vs. payment | Settle deliver instruction (Pos A) to new/Principal increase trade (Trade B) that are allocated using maturing trade position and funded by the investor<br>○ *Deliver position vs. payment* | — |

FIG. 4A Continued

| Priority | Objective | Use Case (Scenario) Trades Involved | RVP | DVP | CASH |
|---|---|---|---|---|---|
| 1 | increase dealer's liquidity by returning excess collateral (based on settled principal amount) which can be used to allocate to/settle DVP trade | f<br>Remove excess collateral from RVP trades (based on required collateral value of settled principal amount)<br>• Excess collateral in maturing trades<br>• Excess collateral in Principal Decrease trades | Settle free receive instruction to remove excess collateral from the trades and into the dealer box<br>○ Free receive - no RVP settlement | -- | -- |
| | | g<br>Remove excess collateral from already settled DVP trades (based on required collateral value of settled principal amount)<br>• Excess collateral in non-maturing trdes | Settle free receive instruction to remove excess collateral from non-maturing trades and into the dealer box **<br>○ Free received - no RVP settlement | -- | -- |
| | Settle free receives | h<br>Settle RVP trades that do not have a cash dealer | Settle free receive instructions to repurchase collateral from maturing trade and Principal Decrease trades and into the dealer box<br>○ Free receive - no RVP settlement | | |

FIG. 4A Continued

| Priority | Objective | Use Case (Scenario) Trades Involved | RVP | DVP | CASH |
|---|---|---|---|---|---|
| | Insert auto cash into trades using Dealer's liquidity | d<br>Use dealer's liquidity to remove ineligible collateral from non-maturing trades against Auto Cash | 1. Settle free receive instruction to receive ineligible collateral from the non-maturing trade and into the dealer box<br>   a. *Free receive instruction - no RVP settlement*<br>2. Insert Auto Cash to non-maturing trade to replace removal of ineligible collateral | -- | -- |

FIG. 4A Continued

CPO Settlement Algorithm: Order of Settlement

| Priority | Objective | Use Case (Scenario) Trades Involved | RVP | DVP | CASH |
|---|---|---|---|---|---|
| 2 | Settle maturing and Principal Decrease trades without collateral to repurchase, using dealer's liquidity | a<br>Settle principal and interest on RVP trades without position movement<br>• Under-collateralized maturing or Principal Decrease trades (based on settled principal amount) | — | — | Settle principal and interest portion of maturing and Principal Decrease trades which are under-collateralized<br>• *No position received vs. principal and interest settlement* |
| | | b<br>Settle interest only on RVP trades without position movement<br>• Non-collateralized interest portion of maturing trades | — | — | Settle interest on trades which do not have interest collateralized<br>• *No position received vs. interest settlement* |

FIG. 4B

CPO Settlement Algorithm: Order of Settlement

| Priority | Objective | Use Case (Scenario) Trades Involved | RVP | DVP | CASH |
|---|---|---|---|---|---|
| 3 | Position movement without use of dealer's liquidity | a<br>Top-off to already settled non-maturing trades<br>• Under-collateralized non-maturing trades (based on settled principal amount) | – | Settle free deliver instruction to top-off to under collateralized trades<br>○ *Free position deliver - no DVP settlement* | – |
|   |   | b<br>Remove inteligible collateral and collateralize with eligible collateral (using "give before you get" method)<br>• Non-maturing trades with ineligible collateral | 2. Settle free receive instructions to receive inteligible collateral (Pos A) from the non-maturing trade and into the dealer box<br>○ *Free receive position - no RVP settlement* | 1. Settle free deliver instruction to over allocate eligible collateral to the non-maturing trade also having ineligible collateral - Pos A)<br>○ *Free position deliver - no DVP settlement* | – |

FIG. 4B Continued

CPO Settlement Algorithm: Order of Settlement

| Priority | Objective | Use Case (Scenario) Trades Involved | RVP | DVP | CASH |
|---|---|---|---|---|---|
| 4 | Settle RVP trades using Fed prescribed order and Dealer's liquidity | a Settle RVP trades that do not have DVP offset (RVP only)<br>• Maturing trades<br>• Principal Decrease trades | Settle receive instruction to repurchase collateral (Pos A) from maturing/Principal Decrease trade<br>○ Receive position vs. payment | -- | -- |
| | | b First, use Dealer's liquidity to settle RVP trades that have DVP offset but DVP trade is not yet funded (RVP)<br>• Maturing trades<br>• Principal Decrease trades<br>Next, once RVP is settled, start to settle DVP trades when investor cash is received (DVP)<br>• Unfunded DVP trades | 1. Settle receive instruction to repurchase collateral (Pos A) from maturing/Principal Decrease trade (Trade A) using dealer's liquidity<br>○ Receive position vs. payment | 1. Settle deliver instruction (POS A) to new/principal Decrease trade (Trade B) that are allocated using maturing trade position and funded by the investor<br>(II Once trade is funded, this occurs in use case: Settle DVP funded trades that do not have RVP offset (DVP only)) | -- |
| | Position movement without use of Dealer's liquidity | c Top off to already settled non-maturing trades Under collateralized non-maturing trades (based on settled principal amount) | 1. Settle free receive instruction to receive collateral (Pos A) from the non-maturing trade and into the dealer box<br>a. *Free receive position – no RVP settlement* | 2. Settle free deliver instruction top off to under-collateralized trades<br>a. *Free position deliver – no DVP settlement* | -- |

FIG. 4C

CPO Settlement Algorithm: Order of Settlement

| Priority | Objective | Use Case (Scenario) Trades Involved | RVP | DVP | CASH |
|---|---|---|---|---|---|
| 4 | Insert auto cash into trades using Dealer's liquidity | Use Dealer's liquidity to remove ineligible collateral from non-maturing trades against auto cash | 1. Settle free receive instruction to receive ineligible collateral from the non-maturing trade and into the dealer box<br>   a. *Free receive instruction - no RVP settlement*<br>2. Insert auto cash to non-maturing trade to replace removal of ineligible collateral | – | – |

FIG. 4C Continued

MULTI-MODAL-BASED GENERATION OF DATA SYNCHRONIZATION INSTRUCTIONS

FIELD OF THE INVENTION

The invention relates to multi-modal-based generation of synchronization instructions.

BACKGROUND OF THE INVENTION

In a Repo (or Repurchase Agreement), a seller (dealer/borrower/cash receiver) sells securities for cash to a buyer (lender/cash provider) and agrees to repurchase those securities at a later date for the principal plus agreed upon interest. The Repo rate is the difference between borrowed and paid back cash expressed as a percentage. The buyer typically utilizes Repos to invest cash for an agreed upon duration of time (typically overnight, although the term may vary), and would receive a rate of interest in return for the investment. The seller typically utilizes Repos to finance long positions in securities or other assets in the seller's portfolio.

Repos are financial instruments used in money markets and capital markets, and are economically similar to a secured loan, with the buyer receiving securities as collateral to protect against default. Virtually any security may be employed in a Repo, including, for example, Treasury or Government bills, corporate and Treasury/Government bonds, stocks/shares, or other securities or financial instruments. In a Repo, however, the legal title to the securities clearly passes from the seller to the buyer, or "investor". Coupons (installment payments that are payable to the owner of the securities), which are paid while the Repo buyer owns the securities are, in fact, usually passed directly onto the Repo seller. This may seem counterintuitive, as the ownership of the collateral technically rests with the buyer during the Repo agreement. It is possible to instead pass on the coupon by altering the cash paid at the end of the agreement, though this is more typical of Sell/Buy Backs.

Although the underlying nature of a Repo transaction is that of a loan, the terminology differs from that used when talking of loans because the seller does actually repurchase the legal ownership of the securities from the buyer at the end of the agreement. Although the actual effect of the whole transaction is identical to a cash loan, in using the "repurchase" terminology, the emphasis is placed upon the current legal ownership of the collateral securities by the respective parties.

In a Tri-Party Repo, the collateral is managed by a Tri-Party dealer (typically a bank), who may match the details of the trade agreed upon by the buyer and the seller, and assumes all of the post trade processing and settlement work (e.g., acting as a clearinghouse). The Tri-Party dealer controls the movement of securities, such that the buyers do not actually take delivery of collateralized securities. The Tri-Party dealer acts as a custodian for the collateral, and allows the flow of collateral and cash between buyers and sellers across one or more deals.

In some Repo agreements, the seller/dealer may have numerous assets that are being managed by the Tri-Party dealer. In these cases, it may be desirable for the Tri-Party dealer to allow for the restructuring of the collateral of the deals, so that the seller may free up some assets while placing other agreeable assets in the legal ownership of the buyer, during the deal. Such movements would generally be agreed to by the buyer and the seller when entering the agreement to be managed by the Tri-Party dealer.

A clearinghouse (e.g., the Tri-Party dealer in some embodiments) may provide liquidity to dealers, who borrow funds from the clearinghouse to unwind maturing deals and obtain funds from new investors to pay back the clearinghouse. As described in U.S. patent application Ser. No. 13/894,991, incorporated above in its entirety by reference, this process conventionally involves a large credit component, such as an intraday credit, that a clearinghouse injects into the system to unwind deals of the day. For example, at the maturity time in the industry, trades are matured, or unwound, and a subset of all the tri-party trades matures. For a deal to mature, the dealer of the trade pays the investor. Specifically, the dealers pay off or repurchase the securities for the maturing deals. The maturing parties quite often have in new deals that are put out. The clearinghouse generally provides cash to the investors and thus may pay the investors on behalf of the dealer and debit the dealers' accounts en masse. Thus, every maturing trade gets paid all at the same time at the maturity time. The clearinghouse then returns the collateral, such as securities, from the investor back to the dealer's account.

For some time after the maturity time the dealer prepares and instructs the clearinghouse regarding new tri-party transactions with the same or new investors. The dealers thus move the collateral, such as those returned from the maturing deals, to new investors, and receive cash upon approval from the clearinghouse that all the cash is satisfactory for the deal, and that all the securities are satisfactory for the deal. The clearinghouse has a lien on the collateral in the dealer's account until the dealer repays the clearinghouse.

Because there is a chance the dealer will be unable to pay back the clearinghouse, the unwinding process exposes the clearinghouse to risk in the period between unwinding of existing trades and reallocation and settlement of new trades. Reallocation and settlement of the new trades extinguishes the exposure to independent events, however presently a time gap of exposure occurs in the minutes or up to several hours before the new trades settle.

SUMMARY OF THE INVENTION

Through various embodiments described herein, the system and method of this disclosure enhances settlement associated with a plurality of Repo agreements. Various embodiments of this disclosure may be used in conjunction with existing financial services platforms, for example the Bank of New York Mellon's Tri-Party repurchase agreement products (RepoEdge®) which allow clients to outsource the operational aspects of their collateralized transactions, and Derivatives Margin Management (DM Edge®), which helps clients manage credit risks associated with derivatives transactions by enabling them to accept, monitor and re-transfer collateral. These services, among others such as Repo Margin Management (RM Edge®), MarginDirect[SM], and Derivatives Collateral Net (DCN), may be delivered to clients through AccessEdge[SM], a real-time, web-based portal.

The invention maximizes settlement based on the assets held in the maturing deal which can be rolled into the new funded deals (based on the eligibility requirements of the new deals). The settlement algorithm may also enforce an order in repurchase of maturing collateral based on asset quality to achieve a fair and transparent settlement mechanism for maturing collateral. Specifically, the settlement algorithm may optimize settlement of maturing trades by using settled funds from new trades, or liquidity/credit as defined by input into system when receive vs. payment (RVP) is greater than delivery vs. payment (DVP). It may be appreciated that substitution cash that exists in non-maturing trades may be used to generate liquidity by allocating excess collateral in place of that cash and using that cash to repurchase collateral in maturing trades. The settlement algorithm may also optimize portfolio of new trades by including collateral from maturing and non-maturing trades, or excess collateral not currently backed up to a certain limit. The settlement algorithm may also define how to repurchase collateral based on defined priorities. Collateral left remaining to be repurchased (after exhausting funding from new trades) will be ordered by a Fed priority based on the quality of the asset class and other trade parameters, such as: ruleset margin, tenure of the maturing trade, maturity date of the security. The repurchase order may be driven by the schedule as configured within the system based upon confirmation by dealers, investors, and/or clearinghouse. The settlement algorithm may minimize the occurrence of ties when determining the repurchase order.

Specifically, an RVP/DVP model is presented that, instead of moving the securities en masse with a large gap in time, relies on smaller, individual movements of securities versus cash. As discussed therein, RVP refers to a maturing deal or a principal decrease deal, in which cash is to be settled from the dealer to the investor in exchange for collateral held by the custodian (e.g., the clearinghouse) to be returned back to the dealer. DVP refers to a new deal or a principal increase deal, in which cash is to be settled from the investor to the dealer in exchange for collateral from the dealer to be held by the custodian. It may be appreciated that by computing smaller incremental settlements, instead of en mass movements, financial exposure of the clearinghouse may be reduced.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates an exemplary repurchase by asset class priority order, according to an implementation of the invention.

FIGS. 4A-4C illustrate a prescribed order for settlement and allocation, according to an implementation of the invention.

DETAILED DESCRIPTION OF THE INVENTION

Figure 1A:
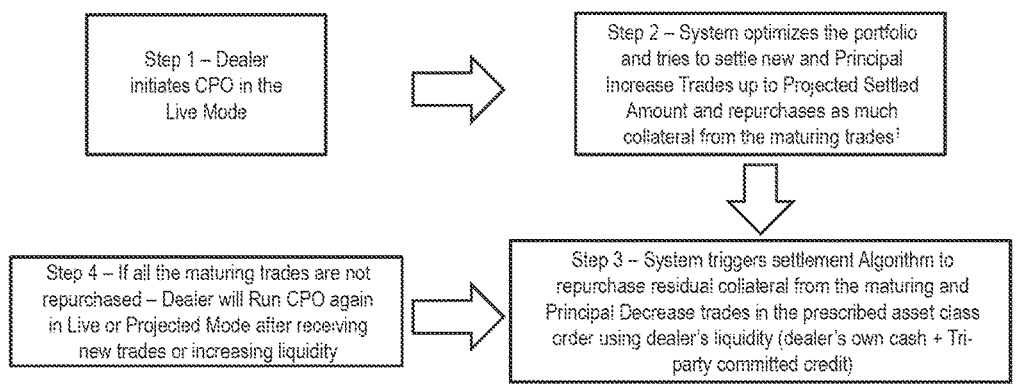
FIGS. 1A and 1B illustrate a flowchart of operation of the settlement algorithm, according to an implementation of the invention.

FIG. 1A illustrates a flowchart of operation 10 of the settlement algorithm which may be implemented by a computer system (e.g. those maintained at a clearinghouse, or otherwise associated with the Tri-Party dealer). It may be appreciated that the order of the steps listed may be merely exemplary, and in some implementations, one or more steps of the operation may occur in a different order than illustrated, or may occur in conjunction with one another. In an operation 12, the dealer may implement the settlement algorithm. In an operation 14, the settlement algorithm may optimize the portfolio and settle new trades and principal increase trades up to a projected settlement amount and repurchases as much collateral from the maturing trades. In an operation 16, the settlement algorithm may repurchase residual collateral from the maturing and principal decrease trades in the prescribed asset class order using dealer's liquidity. In an operation 18, if all of the maturing trades are not repurchased, the settlement algorithm may be run again in live after receiving new trades or increasing liquidity.

As further described therein, embodiments optimize synchronization between datasets (e.g., portfolios) in a live environment and a projected environment. A live dataset (e.g., portfolio or live portfolio) in a live environment/live mode may include data items (e.g., trades) associated with a user. A target dataset (e.g., target portfolio) may include target data items (e.g., trades) corresponding to the data items in the live dataset. The synchronization is performed based at least on an attribute (e.g., representative of a collateral) of the data items. For example, a projected trading/allocation environment (or mode of the system) may be utilized for the system to create the target portfolio. Accordingly, in some embodiments the system may be configured to copy at least portions of the dealer's portfolio to the projected environment. It may be appreciated that such copying may comprise copying of both deals and collateral from the live environment to the projected environment. As indicated above, in some embodiments the copying from the live mode to the projected mode may be on an incremental or rolling basis, which may limit financial exposure to the clearinghouse.

In an embodiment, the system may be configured to implement the settlement algorithm. It may be appreciated that such a settlement algorithm may be implemented in the live mode, so as to not impact the dealer's actual books and records. As described in greater detail below, in an embodiment once a target portfolio is created in the projected mode, the system may be configured to selectively compare it to the current portfolio in the live books and records, and compute the difference between the current portfolio of the live books and records and the target portfolio from the projected mode. In an embodiment, synchronization instructions (e.g., settlement instructions) may subsequently be generated based on the computed difference, and the existing deals may be settled (and new deals created) utilizing the RVP/DVP incremental settlement.

Figure 1B:
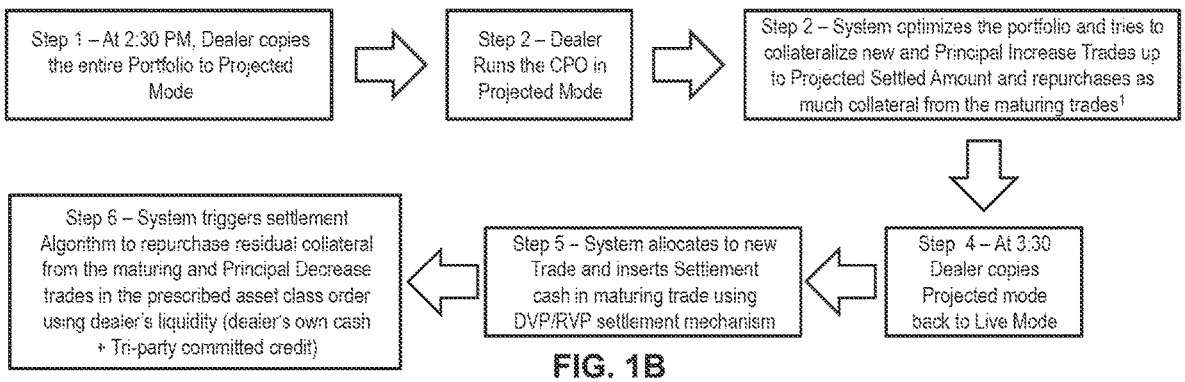

It may be appreciated that in an implementation, operation 10 of the settlement algorithm may be expanded to include similar and/or additional steps, or may include simpler steps that in combination achieve similar outcomes as the other settlement algorithm operations. FIG. 1B illustrates another flowchart of operation 30 of the settlement algorithm. In an operation 32, a dealer may copy an entire portfolio to projected mode. For example, the current books and records may be copied from a live mode of the system to a projected mode. In an embodiment, the live mode trades and current positions may be copied to the projected mode. In an embodiment, the dealer may have the option to choose from predefined templates, or may create a new template that governs the synchronization of live mode with projected mode. In an embodiment, the synchronization may be based upon the time of the day and entry criteria. In an embodiment, synchronization of the live mode and projected mode may involve the securities held by the dealer (including the positions allocated to tri-party repo trades), and the tri-party repo trades which the dealer wants to settle. It may be appreciated that the template may support dealer options such as including or excluding maturing trades or non-maturing trades. In an embodiment, the template may support copying individual positions to the dealer box of the projected mode, or copying individual positions as presently allocated. Accordingly, the dealers may have the option of creating a fresh copy of the securities held or making incremental changes to the existing copy of securities held.

In an operation 34, the dealer may run the settlement algorithm in live mode. In an operation 36, the settlement algorithm may optimize the portfolio and collateralizes new and principal increase trades up to a projected settled amount and repurchases as much collateral from the maturing deals. In an implementation, the settlement algorithm may repurchase the same quality of collateral from maturing trades as that of demanded by the new trade. Since the settlement algorithm considers the entire portfolio of the deal including the non-maturing trades, the actual collateral to new trade could also possibly come out of term trade instead of maturing trade and the type of collateral eventually repurchased from maturing trades may be different from what has gone into the new trade.

In an operation 38, the dealer may be able to periodically synchronize the target portfolio with the live mode, by utilizing a copying option that determines differences (e.g., the net par difference) between the projected target allocations and the live allocations. For example, the dealer may synchronize the incremental changes in the live mode to capture additional trade and position-related changes to the projected mode. To synch the live and projected modes again, a copy to projected mode using net par difference may identify changes have been made to any securities in the live mode, and adjust the projected mode accordingly. In an embodiment, these changes may alter the allocations already done by the dealer in projected mode and may give them an opportunity to correct those exceptions before implementing them in the live mode. In an operation 40, the settlement algorithm allocates to new trades and inserts settlement cash in maturing trades using DVP/RVP settlement mechanism. In an operation 42, the settlement algorithm may trigger repurchase residual collateral from the maturing and principal decrease trades in the prescribed asset class order using the dealer's liquidity. In an operation 44, if all of the maturing trades are not repurchased, the settlement algorithm may be run again in live or projected mode after receiving new trades or increasing liquidity.

Figure 2:
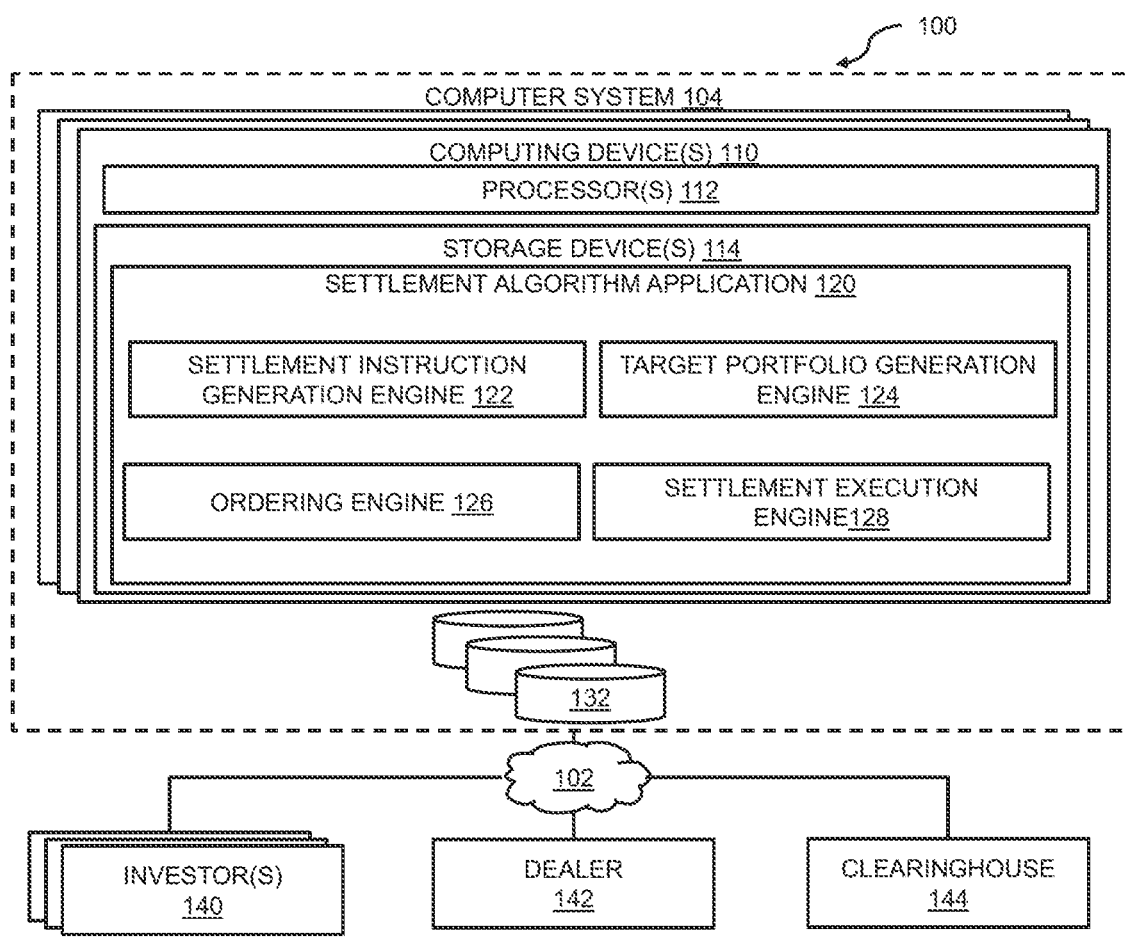
FIG. 2 illustrates a system for implementing a settlement algorithm, according to an implementation of the invention.

FIG. 2 illustrates a configuration of a high-level system 100 for implementing a settlement algorithm, according to an implementation of the invention. The system 100 may maximize settlement by utilizing the funding of new trades to repurchase collateral in maturing trades. The system may also provide an order for repurchase of the maturing collateral based on asset quality to achieve a fair and transparent settlement mechanism for maturing tri-party trades.

Various examples used herein throughout may refer to examples of the settlement algorithm, although other uses and implementations of the system are contemplated and will be apparent to those having skill in the art using the disclosure herein. Having described a overview of some of the system functions, attention will now be turned to various system components that facilitate these and other functions.

System Components

System 100 may include a computer system 104, one or more databases 132, one or more investors 140, a dealer 142, a clearinghouse 144, and/or other components. In some implementation, the clearinghouse 144 may be the Tri-Party dealer 142.

To facilitate these and other functions, computer system 104 may include one or more computing devices 110. Each computing device 110 may include one or more processors 112, one or more storage devices 114, and/or other components.

Processor(s) 112 may be programmed by one or more computer program instructions, which may be stored in storage device(s) 114. The one or more computer program instructions may include, without limitation, settlement algorithm application 120. Settlement algorithm application 120 may itself include different sets of instructions that each program the processor(s) 112 (and therefore computer system 104). For example, settlement algorithm application 120 may include a settlement instruction generator engine 122, a target portfolio generation engine 124, an ordering engine 126, a settlement execution engine 128, and/or other instructions that program computer system 104. As used herein, for convenience, the various instructions will be described as performing an operation, when, in fact, the various instructions program computer system 104 to perform the operation.

Operation of Settlement Algorithm

The settlement algorithm orders the securities within the truly maturing trades based on asset quality, from highest to lowest. The actual settlement of the trades (i.e., the dealer repurchasing the collateral) is dependent on the funding the new trades provide, the asset types those new trades accept, and the dealer's liquidity (which may include a committed credit facility). This allows for a maturing trade to begin settling as soon as there is new funding from another investor, which matches that asset type and/or available dealer liquidity. The new funding drives the actual settlement order until the new funding is exhausted. After that, the actual settlement is driven by the dealer's liquidity using the asset ordering of the settlement algorithm. This allows for the maximum amount of settlements to occur. In addition, the RVP/DVP incremental settlement model allows for maximum usage of liquidity as the entire maturing trade is not required to be settled at one time, but instead, it will settle in increments.

Settlement Algorithm

In one implementation, the system 100 may maximize settlement based on the assets held in the maturing deal which can be rolled into the new funded deals (based on the eligibility requirements of the new deals). Pseudo-code and accompanying description of an implementation of a settlement algorithm operation performed by settlement algorithm application 120 is this described below by way of illustration and not limitation. Other implementations of draining operations may be used as well, based on the disclosure provided herein.

If exists (maturing deals or deals where stl_prin_am>loan_amount){
1. MINMOD to Projected Settled Principal Amount. Be sure to substitute any pending RVP only or DVP/RVP instructions first.
2. Re-Allocate/substitute to project settled principal amount any pending settlement instructions from previous runs. Modify in memory the settled principal amount/projected settled principal amount assuming that the pending settlement instructions have actually settled
3. Execute original CPO end state optimization function, with excess collaterally in deal box (starting in dealer box and collateral not used in MINMOD), optimize on WACC (or WAM if cost of carry schedule doesn't exist) first to MIN (settled principal amount, projected settled principal amount), then to projected settled principal amount.
4. Calculate different between start/end states and generate settlement instructions. Allow RVP. Only settlement instructions to be upgraded to DVP/RVP instructions, otherwise all other settlement instruction are immutable}
Else {
Cancel remaining settlement instructions
}

The above pseudo code describes which accounts are in scope for settlement: namely maturing trades and principal decrease trades or trades that are partially maturing due to the reduced principal amount. The algorithm may attempt to settle those maturing positions, in addition it may also attempt to generate liquidity and perform custodial activities by removing positions that are overallocated in trades, allocating collateral to trades that are undercollateralized, replace ineligible collateral with eligible collateral, and replace substitution cash in trades with eligible collateral. The algorithm may also prioritize the execution of receive versus payment (RVP) instructions and RVP-DVP instructions in order ensure the dealer repurchases collateral first before delivering any collateral to undercollateralized trades. Since the settlement cycle can be iterative (multiple cycles to complete settlement for a particular dealer), any unexecuted instructions should be replicated to the new settlement algorithm execution run. If instructions were successfully completed in the previous settlement run ensure that the trades' projected principal amounts reflect that. Settlement algorithm may then recreate a new target portfolio to continue to attempt to settle maturing trades and principal decrease trades and then allocate collateral to undercollateralized, non-maturing trades. Settlement instructions will be generated to direct the algorithm on how to move from the dealer's portfolio CURRENT STATE to TARGET STATE. Once all RVP and DVP-RVP instructions are complete the settlement process will complete and the remaining DVP instructions will be canceled.

Settlement Monitor

In one implementation, the system 100 may order in repurchase of maturing collateral based on asset quality to achieve a fair and transparent settlement mechanism for maturing collateral. Pseudo-code and accompanying description of an implementation of a settlement algorithm operation performed by settlement algorithm application 120 is this described below by way of illustration and not limitation. Other implementations of draining operations may be used as well, based on the disclosure provided herein.

```
For each dealer_id handed by the current instant
{
    For each pending settlement instruction order by settlement priority
    {
        If RVP only instruction
            Execute on availability of cash/credit
        Else if (DVP/RVP instruction OR DVP only instruction) AND not
RVP not against Cash Dealer Reverse Repo
            If DVP only && Reverse Repo
                Execute
            Else if stl_prin_am < loan_amnt
                If DDA account, execute on availability of cash in the DDA
                Else (funds account), execute
            Else (Deal already settled)
                Execute on availability of NFE
        Else [RVP against cash dealer Reverse Repo]
            Execute when downstream collateral has been purchased
    }
}
```

The above pseudo code describes how the settlement algorithm may process instructions in conjunction with the dealer's available cash and credit. Basically it's ranking how to settle the instructions and where to find the cash or credit for those settlement instructions.

The settlement algorithm requires cash or credit to process RVP instructions since a dealer is actually repurchasing collateral from a lender and requires liquidity to do so. After these RVP settlement instructions have been prioritized for settlement then move to the DVP-RVP instructions so long as the RVP is not an instruction to repurchase collateral from a reverse repo account. However if it is a delivery instruction, DVP, to a reverse repo please proceed to complete that allocation instruction. If an instruction to allocate collateral to a principal increase trade exists, please execute that instruction if there are sufficient funds in the investor's account. If it is a funds account (not cash) execute anyway without checking the DDA account. All other DVP or DVP-RVP instructions should be processed according the available Net Free Equity in the dealer's account.

Creating Settlement Algorithm Instructions

In an implementation, settlement instruction generation engine 122 may create settlement instructions for maturing, principal decrease trades (RVPs) and new, principal increase trades and existing short non-maturing trades (DVPs). In one implementation, settlement instruction generation engine 122 may create settlement instruction which utilize re-purchased collateral from maturing and principal decrease trades based on below listed priority order to top off trade terms by allocating the re-purchased collateral to settled non-maturing trades, allocating the re-purchased collateral to new and principal increase trades, and/or provide the dealers excess collateral. In another implementation, settlement instruction generation engine 122 may create settlement instructions which collateralize DVP settlement, i.e. new and principal increase trades, based on repurchased collateral from maturing and principal decrease trades and/or dealer's excess collateral and ineligible collateral from other non-maturing trades. In another implementation, settlement instruction generation engine 122 may create settlement instructions which collateralize settled non-maturing trades based on repurchased collateral from maturing and principal decrease trades and dealer's excess collateral. In one implementation, dealer's excess collateral may be based on repurchased collateral from maturing and principal decrease trades, collateral from settled non maturing trades ((i.e., excess collateral), and/or collateral released from CBA (i.e., Secured Lending Account).

Processing Settlement Algorithm Requirements

In one implementation, the settlement algorithm application 120 may provide a new settlement process using the settlement algorithm. In one implementation, the settlement algorithm may create DVP/RVP settlement instructions by utilizing positions from maturing and principal decrease trades and allocating the positions to short trades i.e. non-maturing trades, new and principal increase trades. In another implementation, the settlement algorithm may create DVP only settlement instructions by utilizing positions from Dealer box and allocating the positions to short trades i.e. non-maturing, new and principal increase trades. It should be appreciated that DVP may also be collateral delivered to non-maturing trades to replace substitution cash. In another implementation, the settlement algorithm may create RVP only settlement instructions to settle the positions in maturing trades based on Fed prescribed order i.e. based on asset quality from highest to lowest. In another implementation, the settlement algorithm may create cash Instructions to settle under collateralized principal and interest portion of maturing trades.

In another implementation, the settlement algorithm may settle maturing and principal decrease trades. Specifically, the settlement algorithm may execute the settlement instructions for maturing/principal decrease trades (RVP's) using funds from new/principal increase trades, dealer's cash, and/or dealer's available liquidity. In another implementation, the settlement algorithm may net RVPs and DVPs going to the same demand deposit account (DDA). For example, if the settlement algorithm creates a DVP-RVP on the same DDA, the RVP should fund the DVP i.e. when an unwind trade (RVP) settles the cash goes to investors DDA, the same cash should be utilized to settle the DVP.

Generating Target Portfolio for Settlement

In an implementation, target portfolio generation engine 124 may create a target portfolio by optimally maximizing settlement while keeping non-maturing portfolio stable and allocating collateral to any short trades. In one implementation, target portfolio generation engine 124 may utilize a ruleset mapped to each account, a basket ID (BID) schedule mapped to each trade, and/or a collateral preference schedule (CPS) configured for respective dealer to create a target portfolio. In one implementation, target portfolio generation engine 124 may apply MINMOD (minimum modification) tag concepts to existing non-maturing (and rolled) trades so there is minimal disturbance to the already allocated portfolio. When creating the target portfolio, target portfolio generation engine 124 will not be affected by funding availability to repurchase maturing collateral and create instructions with the assumption that cash will be available. Hence, when settlement algorithm is run, the target portfolio generation engine 124 will create pending settlement instructions for all trades for the dealer ID or settlement group, and then settle the instructions based on funding availability or dealer's liquidity.

In another implementation, target portfolio generation engine 124 may move collateral from maturing trades and dealer boxes to non-maturing trades based on the collateral matching criteria, i.e. eligibility per the ruleset, BID and CPS configured for respective dealers. It may be appreciated that the trades must be enabled for incremental settlement. Further, a trade which is deemed under collateralized is when the collateral value is less than required collateral value of the settled principal amount. While creating the target portfolio, target portfolio generation engine 124 may consider settled as well as pending positions in dealer box for allocating to new and principal Increase trades. Ineligible, excess collateral and auto cash/manual cash may be removed by settlement algorithm and possibly re-used to support under-collateralization of another deal or a DVP operation. In one implementation, a settlement execution engine may be responsible for performing credit check and based on the same will execute the settlement instructions and create the allocation instructions. The settlement execution engine may also execute the allocation instructions and instantiates DVP/RVP settlement.

Determining Trades Eligible for Settlement Algorithm

In one implementation, the settlement algorithm application 120 may be utilized in the settlement process of RVP instructions to be considered by settlement algorithm for repurchasing collateral including, but not limited to, maturing trades, decrease portion of rolled trades with principal decrease, decrease portion of non-maturing trades with principal decrease, and the like. The settlement algorithm application 120 may be utilized in the settlement process of DVP instructions considered as a source of funding because the process can delivery securities where sub cash exists, in turn, it is considered a source of funding for the re-purchase of collateral from the maturing trades and allocating to the funded trade including, but not limited to, new trades, principal increase trades, Secured Loan Account (SLA), self-funded SLA, intra-day funding accounts, existing short term trades i.e. under-collateralized non-maturing trades with/without auto-cash (settlement algorithm will not consider other non-maturing trades that are fully collateralized), and the like. It should be appreciated that to repurchase, a RVP instruction is created and removes the collaterals from a maturing trade.

For RVP/DVP trades listed above that utilize the settlement algorithm, these may also include trades which have cash dealer or no cash dealer with the exception of new and principal increase trades if no cash dealer i.e. Settlement algorithm will not consider new and principal increase trades if no cash dealer, have DDA or FUNDS, dealer controlled accounts and/or have a ruleset attached. The eligible trade may also include trades enabled for incremental settlement. If a maturing trade is not set-up for incremental settlement it may need to be un-wounded manually. Further, if a non-maturing trade is not set-up for incremental settlement, a user may need to allocate to such trades and then use the dealer's approval to settle the trade. In one implementation, a report may be developed to identify trades that are not enabled for incremental settlement or settlement via the settlement algorithm.

Creating DVP Settlement Instructions

In case the portfolio is short, i.e. there is not enough collateral available in the RVPs (maturing and principal decrease trades) and dealer box to allocate to all the DVPs (i.e. SLA, Intra-day funding account, existing under collateralized non-maturing trades, new and principal Increase trades) the settlement algorithm may consider a priority to allocate collateral. It should be appreciated that the below listed option would be defined on the default template created for the new settlement process. Also in case of a tie the settlement algorithm will allocate randomly.

In one implementation, accounts with higher priority (lower numerical value) will be collateralized before other accounts. For example, in the below chart the total collateral demand is $550, however the total supply of collateral from maturing, principal decrease trades and Dealer box is $450 (insufficient to collateralize all the deals in scope or to successfully execute the DVP instructions). In such a scenario settlement algorithm will consider the priority assigned at the account level and accordingly prioritize DVPs for allocation based on the priority. In this example it will allocate on top most priority to the SLA trade as it has the highest priority and then move to the second highest priority, i.e. existing non-maturing trade, and lastly allocate to principal increase trade and leave the new trade short.

| Priority | Demand of collateral - Trades requiring collateral (DVPs) | USD | Supply of collateral - Trades requiring collateral (RVPs) | USD |
| --- | --- | --- | --- | --- |
| 2500 | New Trade | 100 | Maturing Trade | 200 |
| 2000 | Principal Increase Trade | 100 | Principal Decrease Trade | 100 |
| 1500 | Existing non-maturing under collateralized trade | 100 | Dealer Box | 150 |
| 1000 | SLA Trade | 250 | | |
| | Total Demand | 550 | Total Supply | 450 |

Ordering Settlement/Repurchase

In an implementation, ordering engine 124 may follow a default prescribed order created to settle/repurchase collateral from the RVP trades. In one implementation, the schedule may be created similarly to the collateral preference schedule (CPS) i.e. create the schedule by assigning lowest priority number to the worst collateral and highest priority number to the best collateral. However the ordering engine 124 may consider the reverse order while settling RVPs i.e. consider the best collateral (highest priority number) first and move downwards. The schedule may also define the asset class, security type priority and the priority based on security maturity date (CDTM), in case of same security type. As shown in FIG. 3, an exemplary repurchase by asset class priority order is illustrated. It should be appreciated that the asset classes may include various assets assigned various priorities.

Creating Settlement Instructions (RVP-Only Repurchase Priority)

The RVP only repurchase priority is a regulatory requirement to ensure that the bank or dealer ensures that RVP instructions are settled in a fair and transparent manner. As mandated by the Federal Reserve, the same RVP repurchase order will apply to all dealers. In one implementation, settlement algorithm may apply a repurchase order to all trades eligible for settlement algorithm. The settlements of the RVP instructions may abide by the RVP repurchase order as described above, provided the dealer has available liquidity. Shown in the below example is a schedule in which the settlement algorithm may repurchase collateral from RVPs (RVP only instructions) in the reverse order i.e. treasuries first and ABS last.

| Schedule of Settlement/Repurchase | Priority Assigned |
| --- | --- |
| ABS | 10 |
| Private Label CMOs | 20 |
| Municipals | 30 |
| Agency CMOs | 40 |
| Treasuries | 50 |

If two or more positions in the maturing trade have same asset class then the settlement algorithm may repurchase by security type priority order. For example, in the below table there are two positions to be repurchased and both the positions have the same asset class i.e. treasury. In such a scenario the settlement algorithm will repurchase the security type "BILL" as it has a higher cost of carry than security type bond.

| Asset Class | Security Type | Priority Order |
| --- | --- | --- |
| Treasury | BILL | 60 |
| Treasury | BOND | 50 |

If two or more positions to be repurchased in the maturing trade have the same asset class and security type, then the settlement algorithm may repurchase that position with earlier security maturity date i.e. position whose maturity date is earlier as compared to the other position's maturity date. For example, as shown below, the settlement algorithm may repurchase security with earlier security maturity date.

| Asset Class | Security Type | Maturity Date | Priority Order |
| --- | --- | --- | --- |
| Treasury | BILL | Feb. 15, 2016 | 65 |
| Treasury | BILL | Mar. 18, 2017 | 60 |

If two or more positions in maturing trade have same asset class, security type and security maturity date then settlement algorithm may repurchase by trade with earlier start date. For example, as shown below, if there are two positions to be re-purchased and both the positions have the same asset class and the same security type and the same security maturity date, the settlement algorithm may repurchase the security type from the trade with an earlier start date.

| Asset Class | Security Type | Maturity Date | Start Date | Priority |
| --- | --- | --- | --- | --- |
| Treasury | BILL | Feb. 15, 2016 | Mar. 18, 2014 | 1 |
| Treasury | BILL | Feb. 15, 2016 | Mar. 20, 2014 | 2 |

If two or more positions to be repurchased have the same asset class, security type, security maturity date and trade start date, the settlement algorithm may repurchase randomly. In case there is no priority assigned to a particular security, the settlement algorithm may assign a "zero" priority number to that security and settle the security considering its priority number as zero. In case a particular security has more than one priority number assigned i.e. duplicate priority number, the settlement algorithm may consider the maximum priority number between the duplicates and settle that position accordingly.

Executing Settlement Instructions

In an implementation, settlement execution engine 128 may execute the created settlement instructions. As shown in FIGS. 4A-4C, the settlement execution engine 128 may execute settlement and allocation of collateral in a prescribed order to efficiency utilize the dealer's cash. Specifically, the settlement execution engine 128 may first settle instructions that remove auto cash in replace of collateral, removes ineligible and excess collateral from trades and delivers available to newly funded trades. This operation may include removal of auto cash from maturing and principal decrease trades, removal of auto cash from non-maturing trades, removal of in-eligible collateral from non-maturing trade against auto-cash to allocate to another short non-maturing trade, settlement of under collateralized non-maturing trades by allocating collateral from dealer box, removal of in-eligible collateral from non-maturing trades and replace with another eligible collateral (using give before you get method), settlement of new and principal increase trades that are funded by the investor against collateral from the dealer box, and/or settlement of new/principal increase trades that are funded by the investor against collateral from the maturing/principal decrease trades and utilize the funding to settle maturing and principal decrease trades.

In another implementation, the settlement execution engine 128 may then remove excess collateral and settle maturing and principal decrease trades without cash dealer. This operation may include removal of excess collateral from maturing and principal decrease trades, removal of excess collateral from non-maturing trades, and/or settlement of maturing and principal decrease trades that do not have a cash dealer. In one implementation, the settlement execution engine 128 may then settle maturing and principal decrease trades without collateral to repurchase, using dealer's liquidity. This operation includes the settlement of under collateralized principal and interest portion of maturing and principal decrease trades and/or non-collateralized interest portion of maturing and principal decrease trades. Finally, the settlement execution engine 128 may settle RVP instructions using prescribed order and dealers liquidity. This operation may include settlement of RVP only instructions based on Dealers liquidity, settlement of RVP side of RVP-DVP instructions based on Dealers liquidity, settlement of under collateralized non-maturing trades by allocating collateral from maturing and principal decrease trades, and/or removal of in-eligible collateral from non-maturing trades against auto cash.

Examples of System Architectures and Configurations

Different system architectures may be used. For example, all or a portion of settlement algorithm application 120 may be executed on a server device. In other words, computing device 110 as illustrated may include a server device that obtains a user request from a user device operated by the user. In implementations where all or a portion of settlement algorithm application 120 is executed on the server device, the server device may perform the functionality of the settlement algorithm application 120.

Although illustrated in FIG. 2 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 2 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 2 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 2 and other drawing Figures, different numbers of entities than depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Exemplary Illustrations

Figure 5:
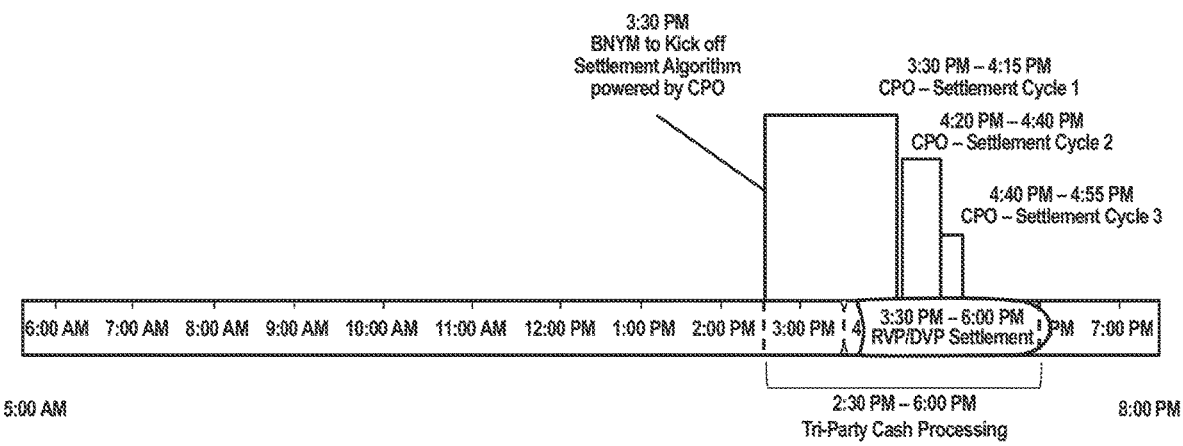
FIG. 5 illustrates an exemplary timeline of the operation of the settlement algorithm, according to an implementation of the invention.

In one implementation, the settlement algorithm includes various operations including creating a target portfolio, comparing portfolio allocations and create settlement instructions, settlement based on dealer's liquidity, and the like. The settlement algorithm may also include an online settlement process and a real-time rehype incremental settlement. As shown in FIG. 5, an exemplary timeline of the operation of the settlement algorithm is illustrated. As illustrated, multiple runs of the settlement algorithm may be run, especially if the dealer is a buyer of rehype collateral and has new RVPs to settle. Once all RVP instructions are settled the pending DVP will be auto deleted by the system. As shown, three settlement cycles may be performed. The first run at 3:30 to prepare initial target portfolio for settlement for all dealers. A second run may be run for the rehype buyers to include the pending rehype receive position into their target state portfolio. A third run may be performed to "catch all" to include any late RVP and/or DVP trades into the target portfolio.

Figure 6:
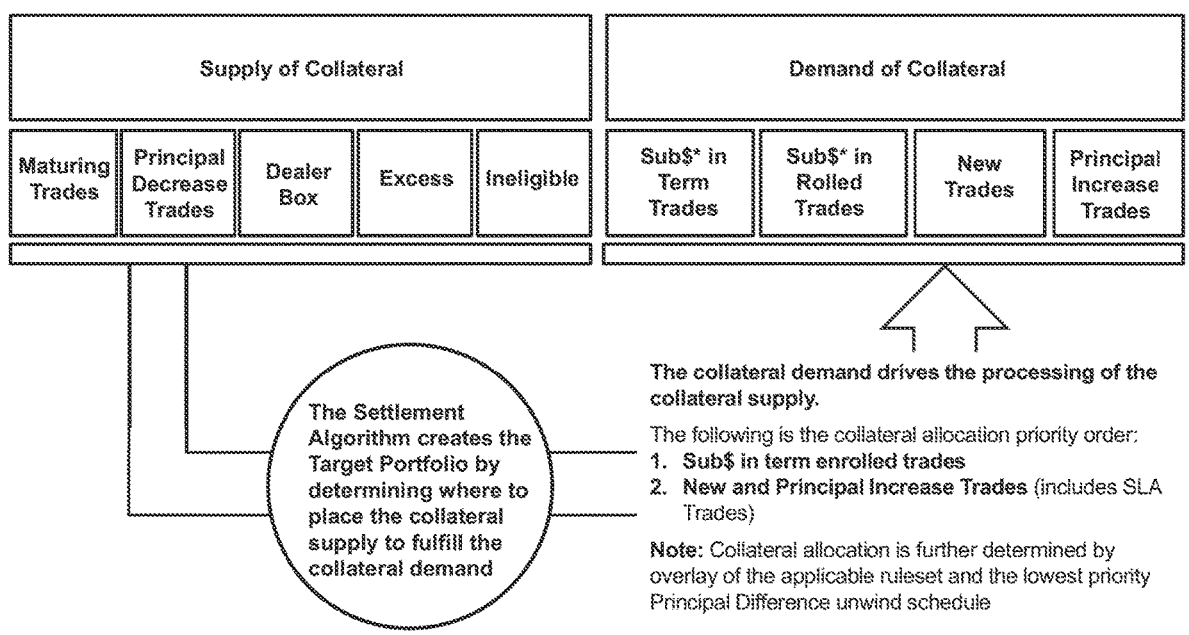
FIG. 6 illustrates an exemplary creation of settlement instructions, according to an implementation of the invention.

As shown in FIG. 6, a target portfolio is created by determining where to place the collateral supply to fulfill the collateral demand. The collateral demand may drive the processing of the collateral supply. Further, the allocation of the collateral may be performed via a priority order.

Figure 7:
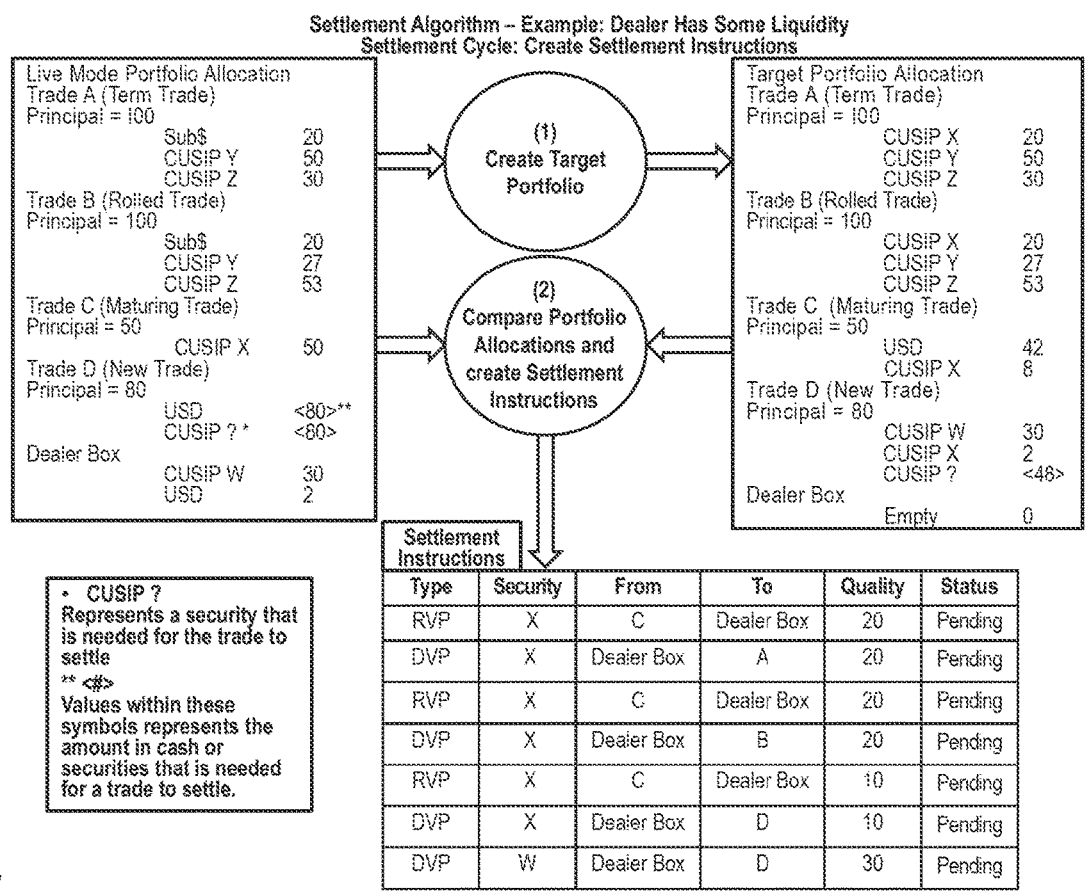
FIGS. 7-9 illustrate an example of dealers having some liquidity and the settlement algorithm creating settlement instructions, according to an implementation of the invention.
Figure 8:
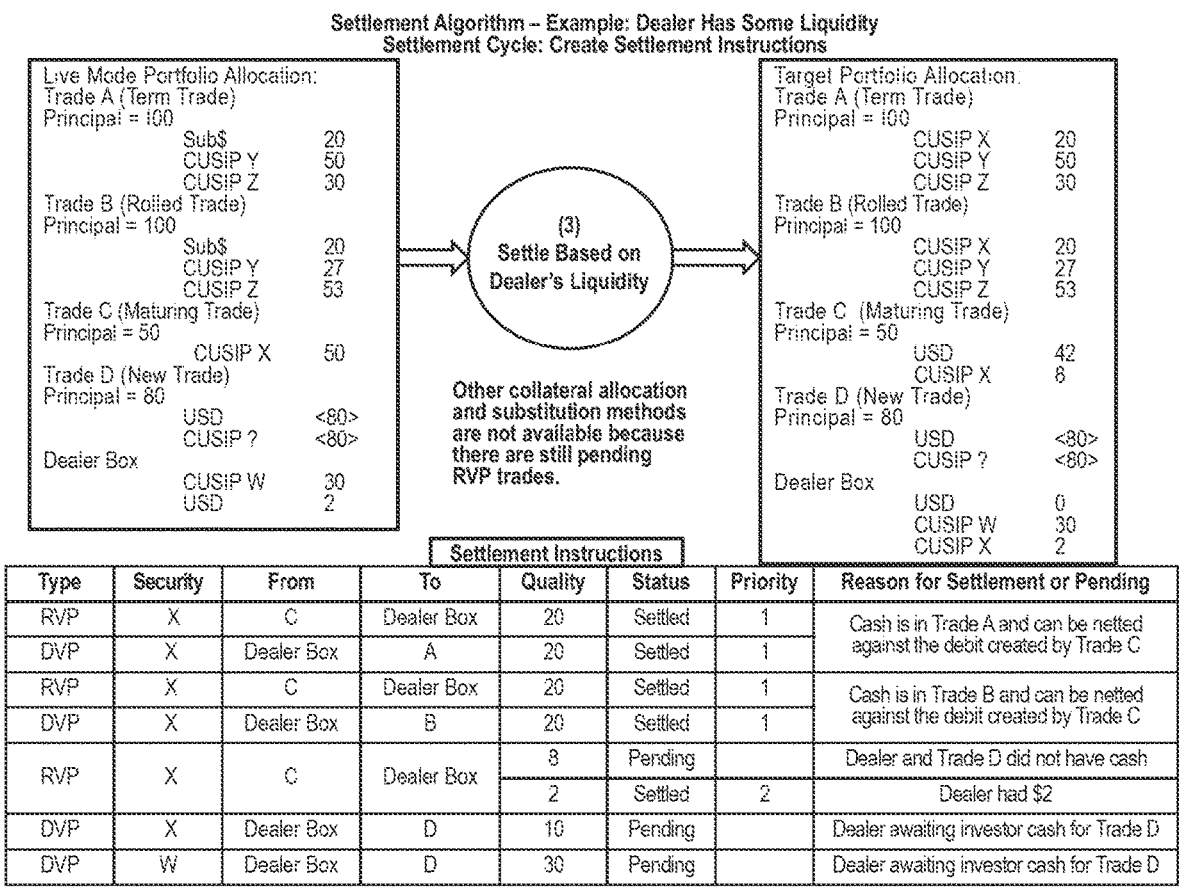
Figure 9:
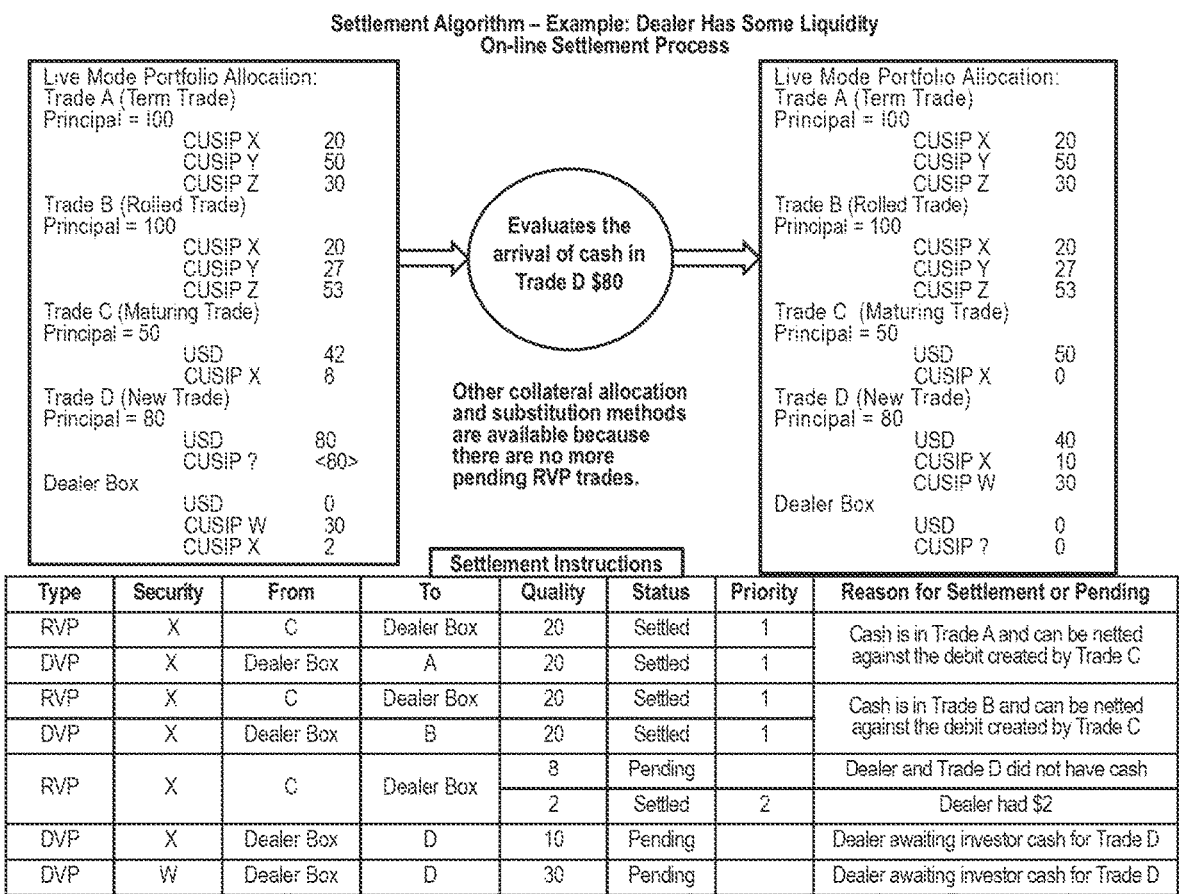

FIGS. 7-9 illustrate an example of dealers having some liquidity and the settlement algorithm creating settlement instructions. As shown in FIG. 7, the settlement algorithm may create a target portfolio and compare portfolio allocations and create settlement instructions. FIG. 8 illustrates the settlement based on the dealer's liquidity when the dealer has some liquidity. FIG. 9 illustrates the online settlement process of the example of the dealers having some liquidity.

Figure 10:
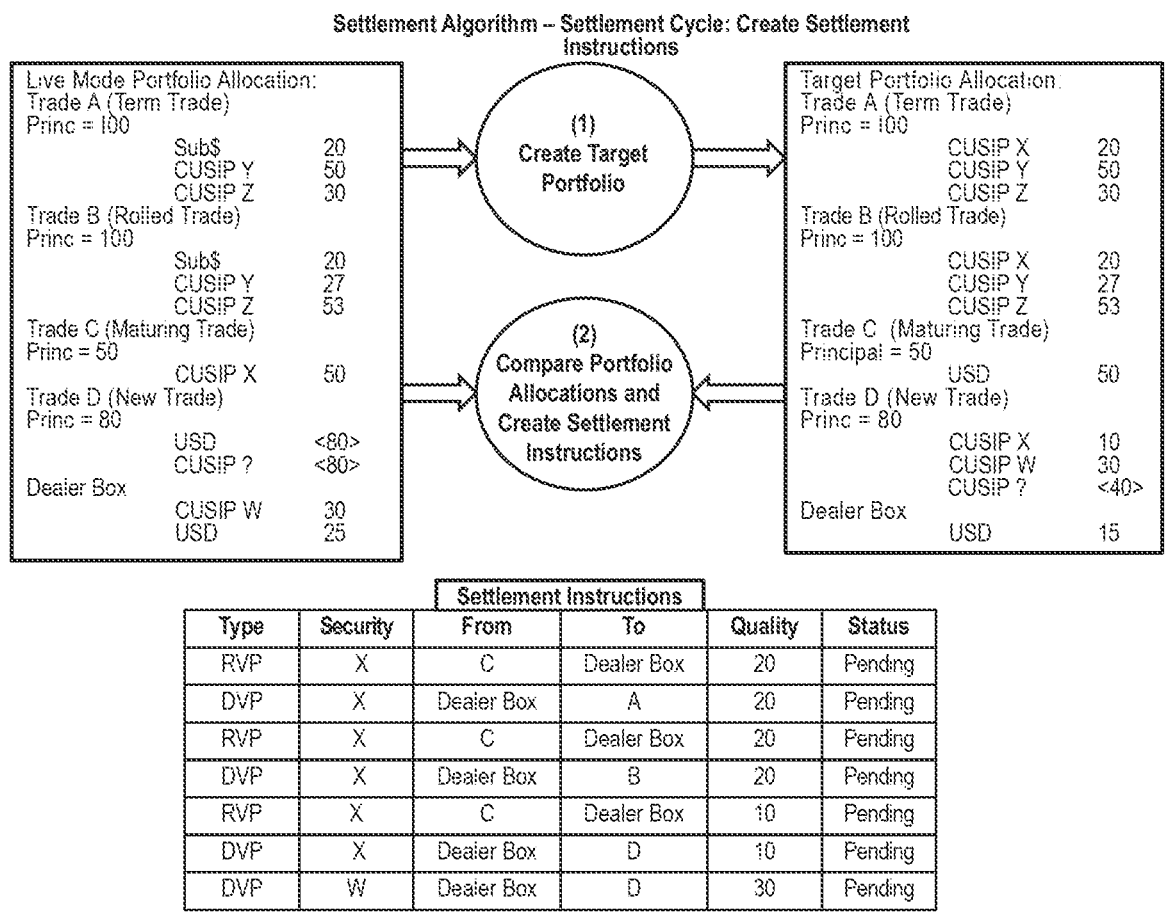
FIGS. 10-12 illustrate an example of the dealer having sufficient liquidity and repurchasing Tri-Party Repo collateral and selling into the Tri-Party Repo trade, according to an implementation of the invention.
Figure 11:
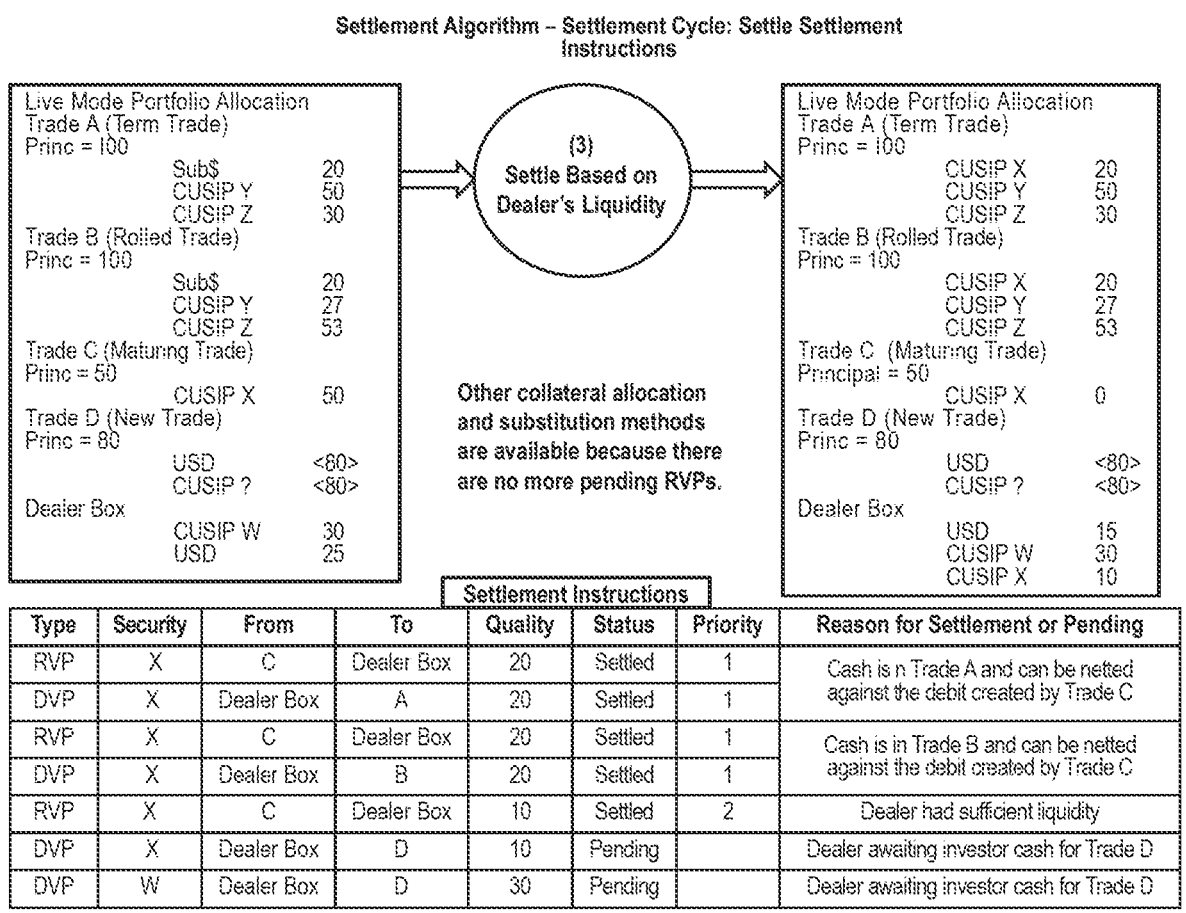
Figure 12:
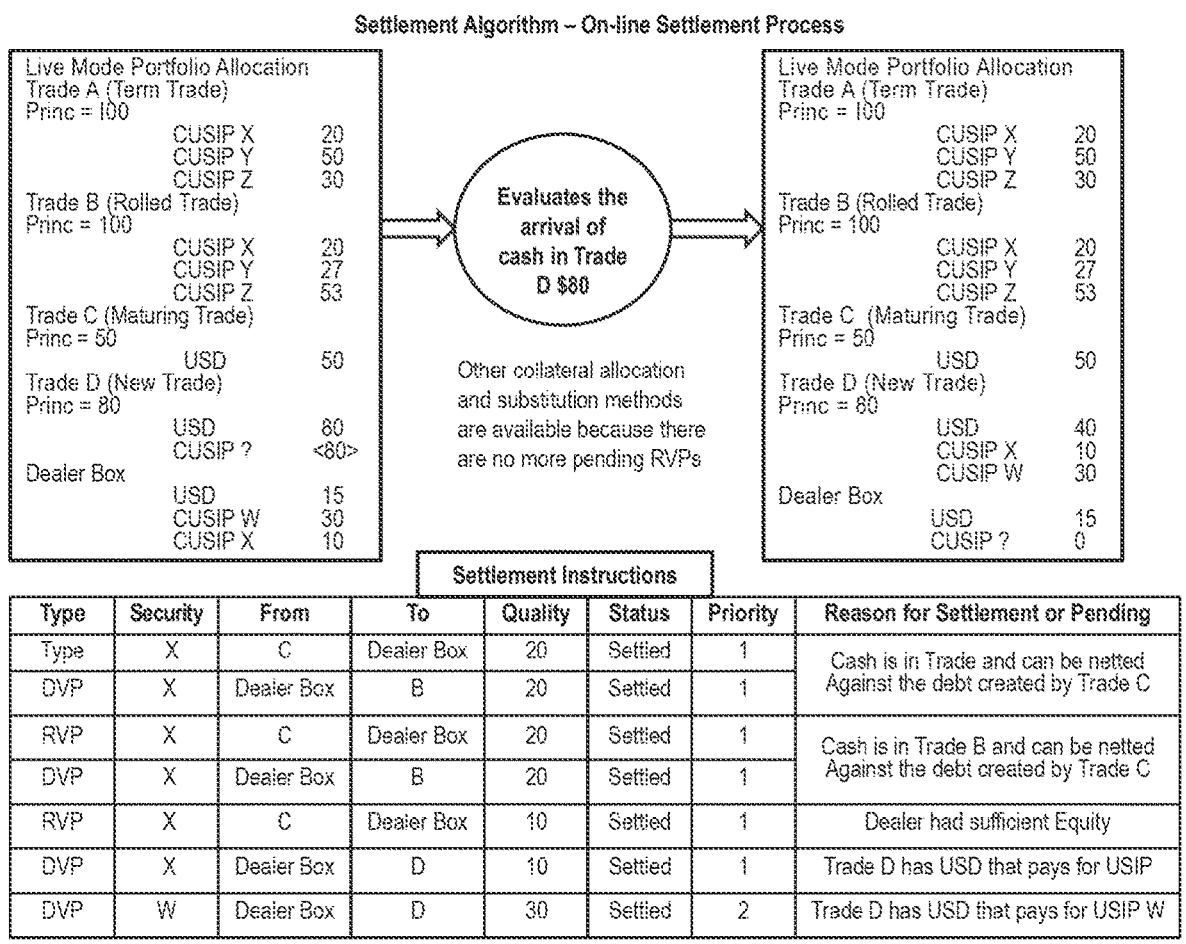

FIGS. 10-12 illustrate an example of the dealer having sufficient liquidity and repurchasing Tri-Party Repo collateral and selling into the Tri-Party Repo trade. As shown in FIG. 10 the settlement algorithm may create a target portfolio and compare portfolio allocations and create settlement instructions. FIG. 11 illustrates the settlement based on the dealer's liquidity. FIG. 12 illustrates the online settlement process of the example of the dealers have sufficient liquidity.

Figure 13:
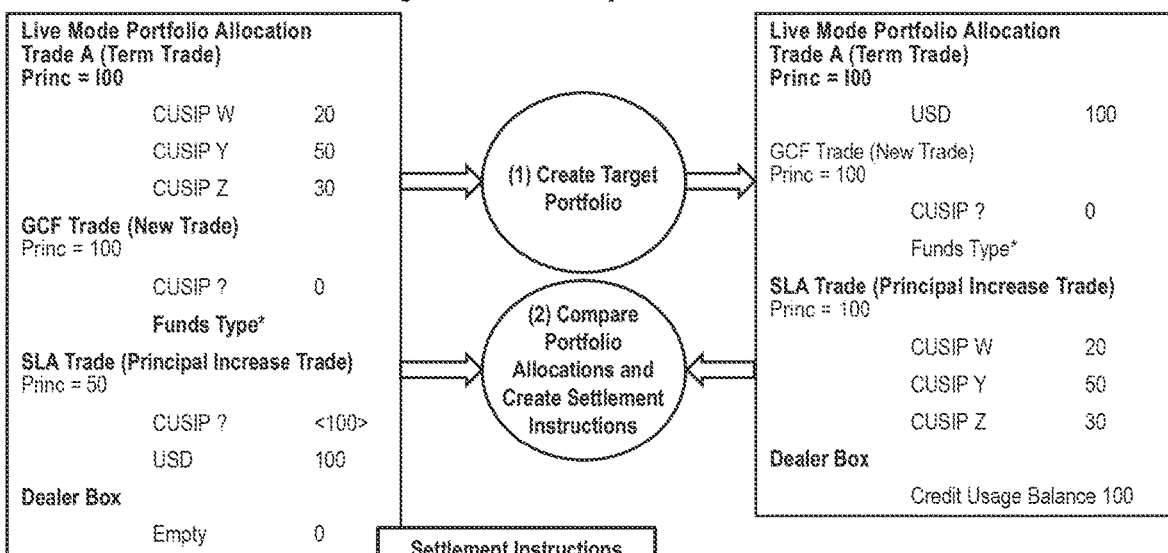
FIGS. 13-17 illustrate a dealer having a committed credit facility and repurchasing Tri-Party Repo collateral and selling into a Tri-Party Repo trade, according to an implementation of the invention.
Figure 14:
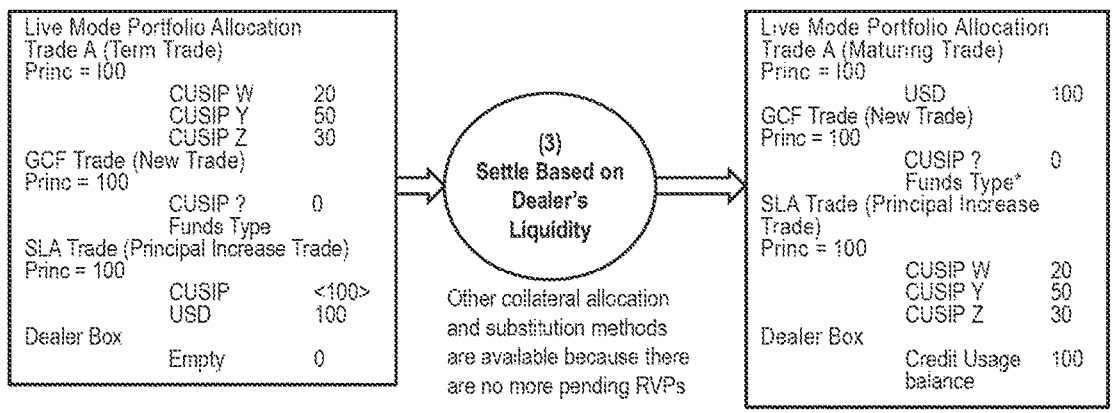
Figure 15:
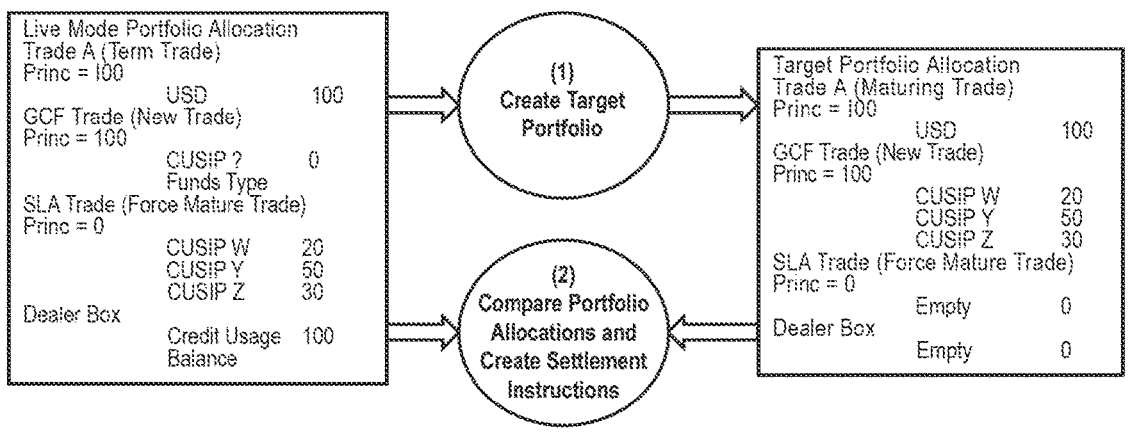
Figure 16:
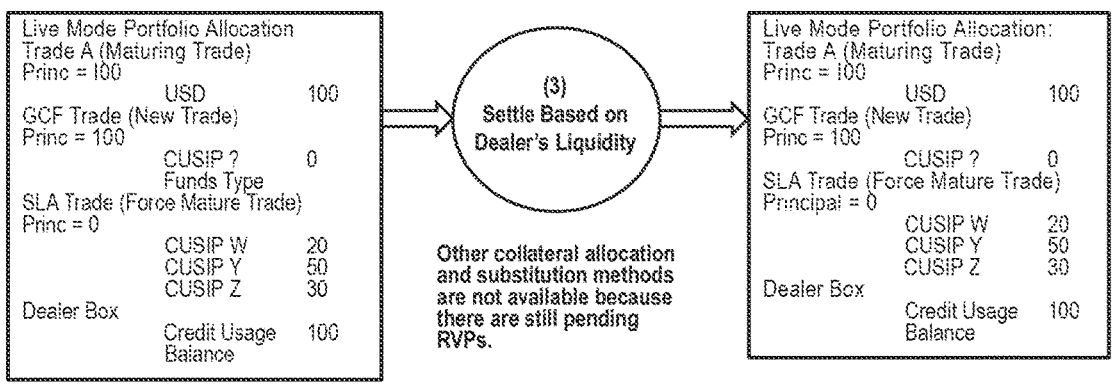
Figure 17:
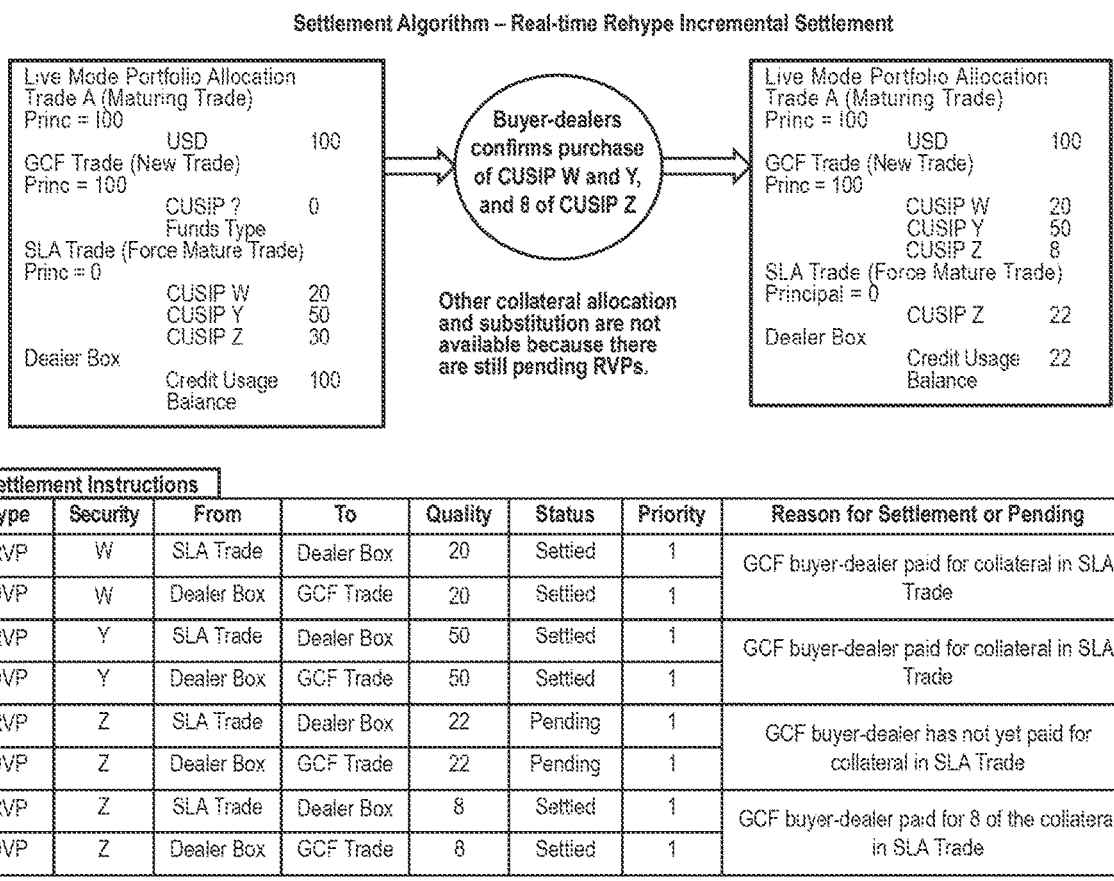

FIGS. 13-17 illustrate a dealer having a committed credit facility and repurchasing Tri-Party Repo collateral and selling into a Tri-Party Repo trade. As shown in FIG. 13 the settlement algorithm may create a target portfolio and compare portfolio allocations and create settlement instructions during a first settlement cycle. FIG. 14 illustrates the settlement based on the dealer's liquidity during a first settlement cycle. As shown in FIG. 15 the settlement algorithm may create a target portfolio and compare portfolio allocations and create settlement instructions during a second settlement cycle. FIG. 16 illustrates the settlement based on the dealer's liquidity during a second settlement cycle. FIG. 17 illustrates a real-time rehype incremental settlement.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for facilitating multi-modal-based generation of synchronization instructions for synchronizing datasets between two data-processing environments, the system comprising:
   a computer system comprising one or more processors programmed with computer program instructions that, when executed, cause the computer system to:
   emulate a live dataset of a live environment in a projected environment to generate a target dataset, the target dataset including target data items corresponding to live data items in the live dataset associated with a user;
   perform partial synchronization between the target dataset of the projected environment and the live dataset of the live environment such that a first subset of changes to the live dataset are reflected in the target dataset and a second subset of changes to the live dataset are not reflected in the target dataset;
   update, subsequent to the partial synchronization, the target dataset to account for the first subset of changes and ignore the second subset of changes; and
   generate, subsequent to the update of the target dataset, synchronization instructions with respect to the live dataset of the live environment based on differences between the target dataset of the projected environment and the live dataset of the live environment and a preference schedule that is representative of an attribute associated with live data items.

2. The system of claim 1, wherein performing the partial synchronization comprises performing the partial synchronization subsequent to execution of prior synchronization instructions with respect to the live dataset of the live environment.

3. The system of claim 1, wherein the computer system is caused to:
   perform, subsequent to the update of the target dataset, further synchronization between the target dataset of the projected environment and the live dataset of the live environment such that the second subset of changes to the live dataset of the live environment are reflected in the target dataset of the projected environment.

4. The system of claim 1, wherein performing the partial synchronization comprises synchronizing a first subset of current attributes of data items of the live dataset to the target dataset, and
   wherein updating the target dataset comprises updating proposed data items of the target dataset of the projected environment such that the update to the proposed data items of the target dataset accounts for the first subset of current attributes of the data items.

5. The system of claim 1, wherein the computer system is caused to:
   determine, subsequent to the update of the target dataset, the differences between the target dataset of the projected environment and the live dataset of the live environment.

6. The system of claim 1, wherein the computer system is caused to:
   perform optimization on an emulated dataset of the projected environment to generate the target dataset in the projected environment.

7. A method comprising:
   emulating, by one or more processors, a live dataset of a live environment in a projected environment to generate a target dataset, the target dataset including target data items corresponding to live data items in the live dataset associated with a user;
   performing, by one or more processors, partial synchronization between the target dataset of the projected environment and the live dataset of the live environment such that a first subset of changes to the live dataset are reflected in the target dataset of the projected environment and a second subset of changes to the live dataset of the live environment are not reflected in the target dataset of the projected environment;
   updating, by one or more processors, subsequent to the partial synchronization, the target dataset to account for the first subset of changes; and
   generating, by one or more processors, subsequent to the update of the target dataset, synchronization instructions with respect to the live dataset of the live environment based on differences between the target dataset of the projected environment and the live dataset of the live environment.

8. The method of claim 7, wherein performing the partial synchronization comprises performing the partial synchronization subsequent to execution of prior synchronization instructions with respect to the live dataset of the live environment.

9. The method of claim 7, further comprising:
performing, by one or more processors, subsequent to the update of the target dataset, further synchronization between the target dataset of the projected environment and the live dataset of the live environment such that a second subset of changes to the live dataset of the live environment are reflected in the target dataset of the projected environment.

10. The method of claim 7, wherein performing the partial synchronization comprises synchronizing a first subset of current attributes of data items of the live dataset to the target dataset, and
wherein updating the target dataset comprises updating proposed data items of the target dataset of the projected environment such that the update to the proposed data items of the target dataset accounts for the first subset of current attributes of the data items.

11. The method of claim 7, further comprising:
determining, by one or more processors, subsequent to the update of the target dataset, the differences between the target dataset of the projected environment and the live dataset of the live environment.

12. The method of claim 7, further comprising:
performing, by one or more processors, optimization on an emulated dataset of the projected environment to generate the target dataset in the projected environment.

13. A non-transitory computer-readable media comprising instructions that, when executed by one or more processors, cause operations comprising:
emulating a live dataset of a live environment in a projected environment to generate a target dataset, the target dataset including target data items corresponding to live data items in the live dataset associated with a user;
performing partial synchronization between the target dataset of the projected environment and the live dataset of the live environment such that a first subset of changes to the live dataset are reflected in the target dataset of the projected environment and a second subset of changes to the live dataset of the live environment are not reflected in the target dataset of the projected environment;
updating, subsequent to the partial synchronization, the target dataset to account for the first subset of changes; and
generating, subsequent to the update of the target dataset, synchronization instructions with respect to the live dataset of the live environment based on differences between the target dataset of the projected environment and the live dataset of the live environment.

14. The non-transitory computer-readable media of claim 13, wherein performing the partial synchronization comprises performing the partial synchronization subsequent to execution of prior synchronization instructions with respect to the live dataset of the live environment.

15. The non-transitory computer-readable media of claim 13, the operations further comprising:
performing, subsequent to the update of the target dataset, further synchronization between the target dataset, further synchronization between the target dataset of the projected environment and the live dataset of the live environment such that a second subset of changes to the live dataset of the live environment are reflected in the target dataset of the projected environment.

16. The non-transitory computer-readable media of claim 13, wherein performing the partial synchronization comprises synchronizing a first subset of current attributes of data items of the live dataset to the target dataset, and
wherein updating the target dataset comprises updating proposed data items of the target dataset of the projected environment such that the update to the proposed data items of the target dataset accounts for the first subset of current attributes of the data items.

17. The non-transitory computer-readable media of claim 13, the operations further comprising:
determining, subsequent to the update of the target dataset, the differences between the target dataset of the projected environment and the live dataset of the live environment.

18. The non-transitory computer-readable media of claim 13, the operations further comprising:
performing optimization on an emulated dataset of the projected environment to generate the target dataset in the projected environment.

* * * * *